United States Patent
Han et al.

(10) Patent No.: US 11,206,706 B2
(45) Date of Patent: *Dec. 21, 2021

(54) METHOD AND APPARATUS FOR WEB BROWSING ON MULTIHOMED MOBILE DEVICES

(71) Applicant: AT&T Intellectual Property I, L.P., Atlanta, GA (US)

(72) Inventors: Bo Han, Bridgewater, NJ (US); Rittwik Jana, Montville, NJ (US); Lusheng Ji, Randolph, NJ (US); Feng Qian, Bloomington, IN (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/558,283

(22) Filed: Sep. 2, 2019

(65) Prior Publication Data

US 2019/0387565 A1     Dec. 19, 2019

Related U.S. Application Data

(63) Continuation of application No. 14/971,968, filed on Dec. 16, 2015, now Pat. No. 10,405,365.

(51) Int. Cl.
*H04W 76/15*     (2018.01)
*H04L 12/707*    (2013.01)
(Continued)

(52) U.S. Cl.
CPC ......... *H04W 76/15* (2018.02); *H04L 43/0864* (2013.01); *H04L 45/24* (2013.01);
(Continued)

(58) Field of Classification Search
CPC ... H04W 76/025; H04W 76/15; H04W 28/08; H04L 43/0864; H04L 45/24; H04L 47/122; H04L 47/193; H04L 47/41
(Continued)

(56) References Cited

U.S. PATENT DOCUMENTS 6,963,927 B1   11/2005   Lee et al.
6,981,055 B1   12/2005   Ahuja et al.
(Continued)

FOREIGN PATENT DOCUMENTS

EP        2461631         6/2012
WO    WO 03/001330        1/2003

OTHER PUBLICATIONS

"Auto Switch Between Wi-Fi & Mobile Data Networks—Samsung Galaxy S® III mini," Verizon, verizonwireless.com, Dec. 24, 2014. https://web.archive.org/web/20141224224150/http://www.verizonwireless.com/support/knowledge-base-93049/.
(Continued)

*Primary Examiner* — Ricky Q Ngo
*Assistant Examiner* — Ellen A Kirillova

(57) ABSTRACT

In one example, a method and apparatus for web browsing on multihomed mobile devices having multiple communication interfaces are disclosed. In one example, the method establishes a primary multiple path transmission control protocol subflow for the transfer of a resource from a server to a user endpoint device. The method then determines a threshold of resource size. When the size of the resource is determined to exceed the threshold, the method establishes a secondary multipath transmission control protocol connection that cooperates with the primary multiple path transmission control protocol subflow for the transfer of the resource from the server to the user endpoint device.

20 Claims, 4 Drawing Sheets

(51) Int. Cl.
*H04L 12/26* (2006.01)
*H04L 12/803* (2013.01)
*H04L 12/801* (2013.01)
*H04L 12/891* (2013.01)
*H04W 28/08* (2009.01)
*H04W 76/16* (2018.01)

(52) U.S. Cl.
CPC .......... *H04L 47/122* (2013.01); *H04L 47/193* (2013.01); *H04L 47/41* (2013.01); *H04W 28/08* (2013.01); *H04L 43/0888* (2013.01); *H04W 76/16* (2018.02)

(58) Field of Classification Search
USPC ........................................................ 370/329
See application file for complete search history.

(56) References Cited

U.S. PATENT DOCUMENTS

| | | | |
|---|---|---|---|
| 7,133,365 B2 | 11/2006 | Klinker et al. | |
| 7,680,949 B2 | 3/2010 | Ishiyama et al. | |
| 7,761,562 B1 | 7/2010 | Stewart et al. | |
| 7,769,884 B2 | 8/2010 | Acharya et al. | |
| 7,821,985 B2 | 10/2010 | Van Megen et al. | |
| 7,917,650 B2 | 3/2011 | Chandrayana et al. | |
| 7,979,577 B2 | 7/2011 | Taylor et al. | |
| 8,014,819 B2 | 9/2011 | Manousakis et al. | |
| 8,078,753 B2 | 12/2011 | Bachmann et al. | |
| 8,160,056 B2 | 4/2012 | Van der Merwe et al. | |
| 8,260,922 B1 | 9/2012 | Aggarwal et al. | |
| 8,291,108 B2 | 10/2012 | Raja et al. | |
| 8,295,181 B2 | 10/2012 | Bradford et al. | |
| 8,539,053 B2 | 9/2013 | Sarikaya et al. | |
| 8,792,501 B1 | 7/2014 | Rustagi et al. | |
| 8,848,540 B2 | 9/2014 | Dhanapal | |
| 8,873,527 B2 | 10/2014 | Masputra | |
| 2004/0111541 A1 | 6/2004 | Meyer | |
| 2007/0091921 A1 | 4/2007 | Elliot | |
| 2007/0109961 A1* | 5/2007 | Liang | H04L 43/10 370/229 |
| 2008/0200168 A1 | 8/2008 | Jiang | |
| 2010/0110921 A1 | 5/2010 | Famolari | |
| 2012/0014252 A1* | 1/2012 | Martin | H04W 28/20 370/235 |
| 2012/0071141 A1 | 3/2012 | Nicoara et al. | |
| 2013/0060893 A1* | 3/2013 | Harvell | H04L 47/193 709/217 |
| 2015/0381455 A1* | 12/2015 | Martinsen | H04L 45/22 370/252 |

OTHER PUBLICATIONS

Elban, "[APP][2.2+] Super Download 1.5—Wifi + Mobile, like Download Booster [Aug. 21, 2013]," XDA Developers, xda-developers.com, Aug. 8, 2013. http://forum.xda-developers.com/showthread.php?t=1667025.

"Speed up everything you do online," Speedify, speedify.com, Jun. 13, 2014. https://web.archive.org/web/20140613131310/http://speedify.com/.

\* cited by examiner

METHOD AND APPARATUS FOR WEB BROWSING ON MULTIHOMED MOBILE DEVICES

This application is a continuation of U.S. patent application Ser. No. 14/971,968, filed Dec. 16, 2015, now U.S. Pat. No. 10,405,365, which is herein incorporated by reference in its entirety.

The present disclosure relates to a method and apparatus for web browsing on multihomed mobile devices having multiple communication interfaces.

BACKGROUND

Mobile devices such as smartphones, tablet computers, laptop computers, and the like are often equipped with multiple network interfaces that support diverse access technologies. For example, many smartphones include network interfaces that allow them to access both wireless fidelity (WiFi) and cellular networks. Such devices may be referred to as "multihomed," because such devices are capable of connecting to more than one communications network.

SUMMARY OF THE DISCLOSURE

In one example, a method and apparatus for web browsing on multihomed mobile devices having multiple communication interfaces are disclosed. In one example, the method establishes a primary multiple path transmission control protocol subflow for the transfer of a first portion of a resource from a server to a user endpoint device. The method then determines a threshold of resource size. When the size of the resource is determined to exceed the threshold, the method establishes a secondary multipath transmission control protocol subflow that cooperates with the primary multiple path transmission control protocol subflow for the transfer of the resource from the server to the user endpoint device.

In another example, a non-transitory computer-readable storage device stores a plurality of instructions which, when executed by a processor, cause the processor to perform operations. The operations include establishing a primary multiple path transmission control protocol subflow for the transfer of a resource from a server to a user endpoint device. The operations further include determining a threshold of resource size. When the size of the resource is determined to exceed the threshold, the operations further include establishing a secondary multipath transmission control protocol subflow that cooperates with the primary multiple path transmission control protocol subflow for the transfer of the resource from the server to the user endpoint device.

In another example, an apparatus includes a first network interface supporting a first network access type, a second network interface supporting a second network access type, a processor, and a computer-readable storage device storing a plurality of instructions which, when executed by a processor, cause the processor to perform operations. The operations include establishing a primary multiple path transmission control protocol subflow for the transfer of a resource from a server to a user endpoint device. The operations further include determining a threshold of resource size. When the size of the resource is determined to exceed the threshold, the operations further include establishing a secondary multipath transmission control protocol subflow that cooperates with the primary multiple path transmission control protocol subflow for the transfer the resource from the server to the user endpoint device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
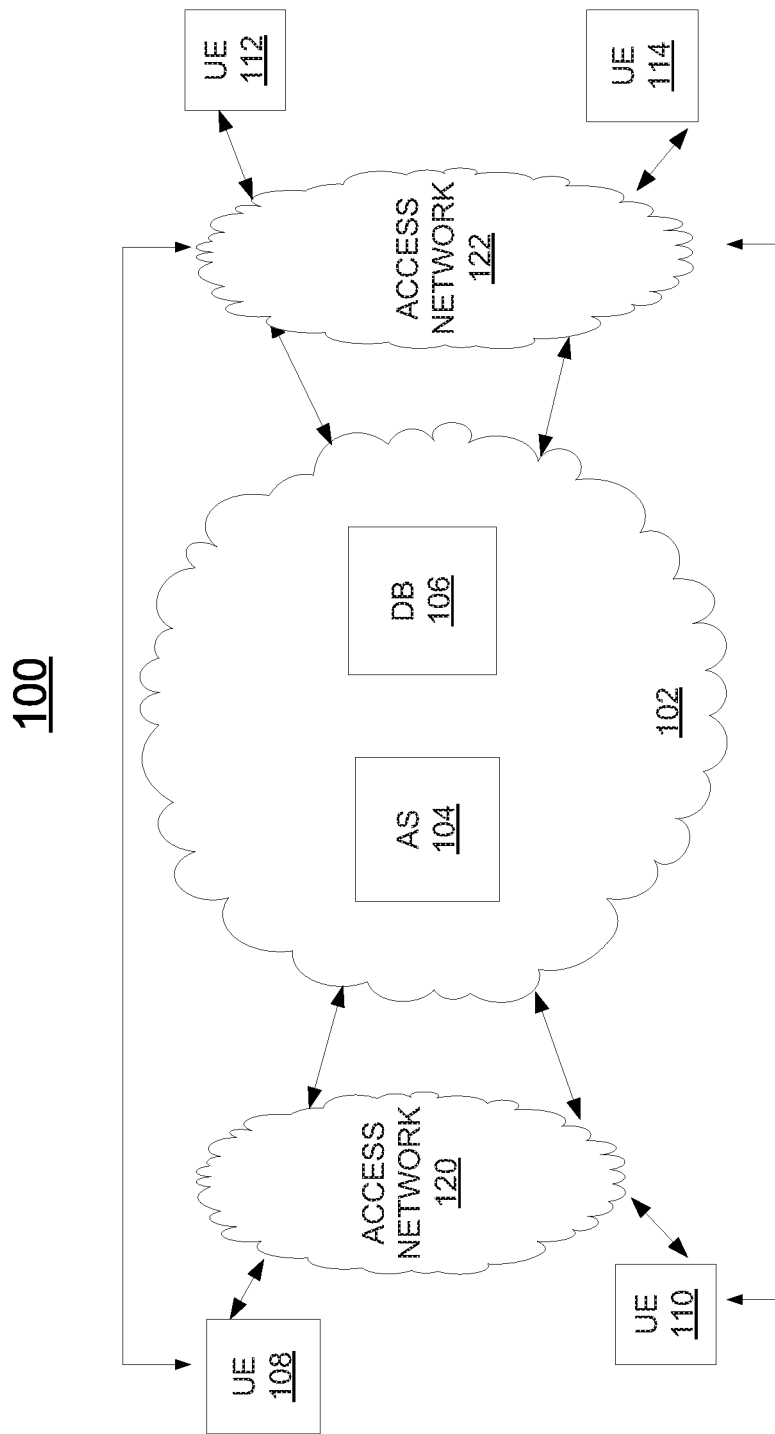
FIG. 1 is a block diagram depicting one example of a communications network.

Mobile devices such as smartphones, tablet computers, laptop computers, and the like are often used to access applications that involve the transfer of data or resources, such as web browsing. Mobile devices that are multihomed can access these applications via more than one access technology, i.e., via a plurality of different types of network access interfaces. For instance, some smartphones include both WiFi and cellular network interfaces which allow them to browse the web via a connection to a WiFi network or a connection to a cellular network.

Many modern web browsers rely on transmission control protocol (TCP) for the transfer of resources such as web pages and associated data objects (e.g., hypertext markup language (HTML) documents). TCP includes both single path TCP (SPTCP) in which data is transferred via a single subflow and mutlipath TCP (MPTCP) in which data is transferred via multiple subflows. Thus, MPTCP increases TCP throughput. MPTCP is backwards compatible with SPTCP and is particularly useful for transferring data over wireless networks.

The most common configuration of MPTCP on multihomed devices uses a WiFi interface for the primary TCP subflow and a cellular interface for the secondary TCP subflow. This configuration minimizes cellular data usage and device power consumption. The ability to aggregate the bandwidth of the WiFi and cellular links can also boost performance when transferring a large data object over a network. However, the advantages are less pronounced when transferring smaller data objects, since the transfer could be completed even before the secondary subflow begins. Thus, using multiple MPTCP subflows as a default for all data transfers is not ideal, since it can needlessly increase cellular data usage and device power consumption by setting up unnecessary secondary subflows, waste cellular access network channel resources, and generate unnecessary data and signaling overhead in cellular core networks.

The present disclosure broadly describes a method, a computer-readable storage device, and an apparatus for web browsing on multihomed mobile devices having multiple communication interfaces. Examples of the present disclosure employ a hybrid transport layer that uses hypertext transfer protocol (HTTP) over MPTCP. Resources to be transferred (e.g., web objects, HTML documents, etc.) are assigned to the underlying MPTCP subflows of the hybrid transport layer based on object size and network conditions. In one example, the primary MPTCP subflow is used to transfer data having a size that is less than or equal to a threshold size (e.g., over a wireless network). However, if the size of the data exceeds the threshold size, then one or more secondary MPTCP subflows are established, and the secondary subflows are used together with the primary subflow to transfer the data (e.g., over both a wireless network and a mobile network). This approach leverages the fact that web objects are typically relatively small in size (e.g., ten thousand bytes or smaller, and often only one thousand or two thousand bytes). If the resource to be transferred is smaller than the threshold size, a secondary MPTCP subflow may not be established or used at all. Thus, cellular data and device power are conserved with minimal impact on browser performance.

FIG. 1 is a block diagram depicting one example of a communications network 100. The communications network 100 may be any type of communications network, such as for example, a traditional circuit switched network (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional illustrative IP networks include Voice over IP (VoIP) networks, Service over IP (SoIP) networks, and the like.

In one example, the network 100 may comprise a core network 102. The core network 102 may be in communication with one or more access networks 120 and 122. The access networks 120 and 122 may include a wireless access network (e.g., a WiFi network and the like), a mobile or cellular access network, a PSTN access network, a cable access network, a wired access network and the like. In one example, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the core network 102 may include an application server (AS) 104, e.g., a database server, and a database (DB) 106. Although only a single AS 104 and a single DB 106 are illustrated, it should be noted that any number of application servers 104 or databases 106 may be deployed. The AS 104 and the DB 106 may or may not be owned by a service provider. For instance, in one example, a service provider can host the AS 104 and/or DB 106 for a content provider.

In one example, the AS 104 may comprise a web server that stores, processes, and delivers web pages and associated data objects (e.g., hypertext markup language (HTML) documents) via HTTP. The AS 104 may retrieve and/or modify information from the DB 106 to dynamically generate these data objects, or the AS 104 may return static documents.

In one example, the access networks 120 and 122 may be in communication with one or more user endpoint devices (also referred to as "endpoint devices" or "UE") 108, 110, 112, and 114. In one example, the user endpoint devices 108, 110, 112 and 114 may be any type of endpoint device such as a desktop computer or a mobile endpoint device such as a cellular telephone, a smart phone, a tablet computer, a laptop computer, a netbook, an ultrabook, a portable media device (e.g., an MP3 player), a gaming console, a portable gaming device, and the like. Any of the user endpoint devices 108, 110, 112, and 114 may be configured as a computer similar to that illustrated in FIG. 4 and described in greater detail below.

In one example, at least some of the user endpoint devices 108, 110, 112, and 114 are multihomed devices that are capable of connecting to more than one communications network. In other words, each multihomed device has a plurality of different network interfaces (e.g., a first network interface such as a wireless network interface for connecting to a WiFi network, and a second network interface such as a cellular network interface for connecting to a cellular network). For instance, in FIG. 1, the user endpoint devices 108 and 110 are capable of connecting to the access network 120 and the access network 122, where the access network 120 and the access network 122 may comprise different types of access networks (e.g., access network 120 may comprise a wireless network such as a WiFi network, while access network 122 may comprise a cellular network such as an LTE network). It should be noted that although only four user endpoint devices (and two specifically multihomed user endpoint devices) are illustrated in FIG. 1, any number of user endpoint devices and/or multihomed user endpoint devices may be deployed.

It should also be noted that the network 100 has been simplified. For example, the network 100 may include other network elements (not shown) such as border elements, routers, switches, policy servers, security devices, firewalls, a content distribution network (CDN) and the like.

Figure 2:
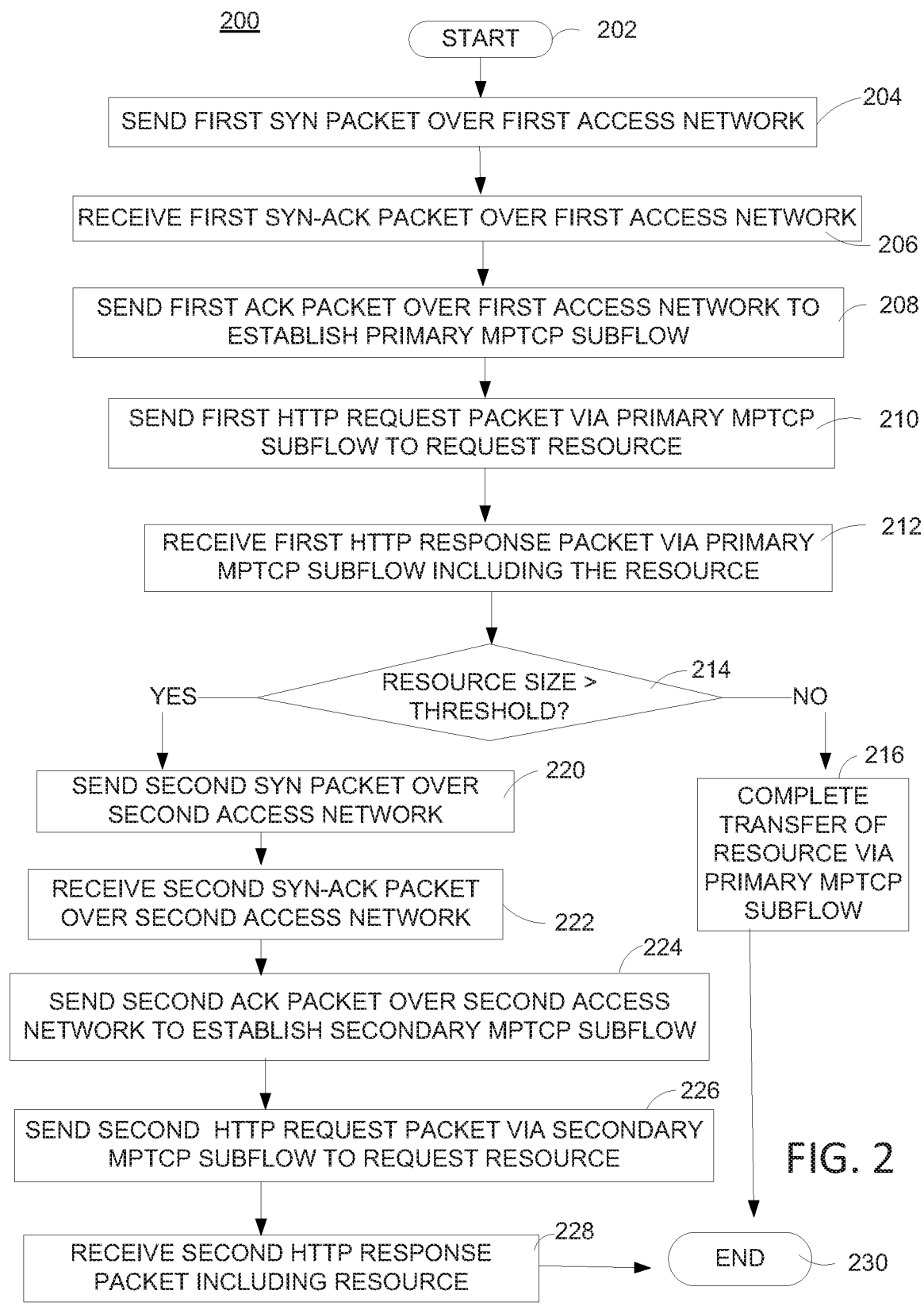
FIG. 2 illustrates a flowchart of an example method of the present disclosure for web browsing on a multihomed mobile device.
Figure 3:
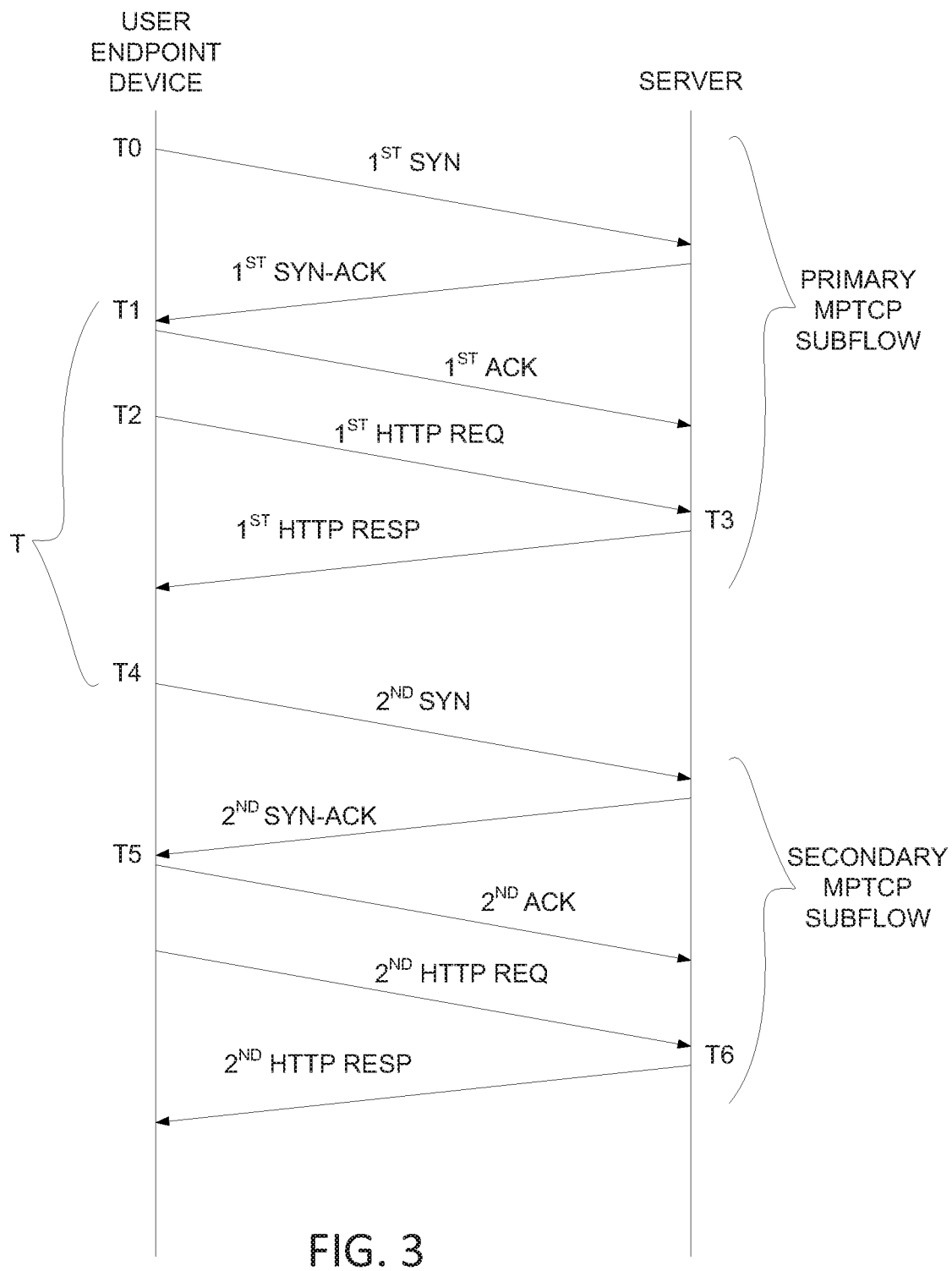
FIG. 3 illustrates an example sequence diagram corresponding to portions of the method of FIG. 2.

FIG. 2 illustrates a flowchart of an example method 200 of the present disclosure for web browsing on a multihomed mobile device. FIG. 3 illustrates an example sequence diagram corresponding to portions of the method 200 of FIG. 2. FIG. 2 and FIG. 3 may be referred to simultaneously in connection with the following discussion for a complete understanding of the disclosed method for web browsing on a multihomed mobile device.

Figure 4:
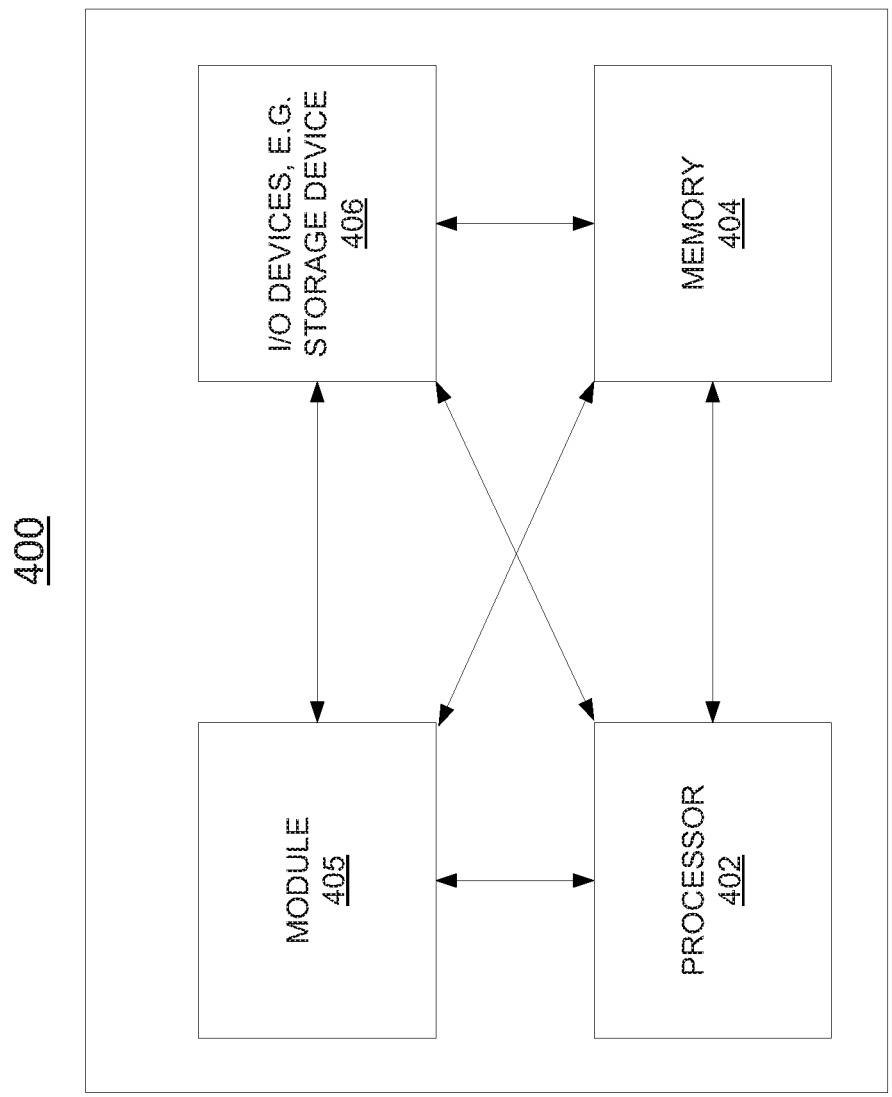
FIG. 4 depicts a high-level block diagram of a computer suitable for use in performing the functions described herein.

In one example, the method 200 may be implemented in a multihomed user endpoint device, such as one of the user endpoint devices 108 and 110 illustrated in FIG. 1, or in the computer or processor as described in FIG. 4. For the sake of example, the method 200 is described as being implemented by the user endpoint device 108.

The method 200 begins in step 202. In step 204, the user endpoint device 108 sends a first handshake packet, e.g., a first SYN packet, to the AS 104 over a first access network (e.g., one of access network 120 or access network 122). The first access network may be, for example, a wireless access network (e.g., a WiFi network). In one example, the first SYN packet is a request to establish a primary MPTCP subflow between the user endpoint device 108 and the AS 104.

In step 206, the user endpoint device 108 receives a second handshake packet, e.g., a first SYN-ACK packet, from the AS 104, over the first access network.

In step 208, the user endpoint device 108 sends a third handshake packet, e.g., a first ACK packet, to the AS 104, over the first access network. Thus, collectively, steps 204-208 establish an MPTCP subflow between the user endpoint device 108 and the AS 104 via a three-way handshake. This MPTCP subflow becomes the primary MPTCP subflow for the exchange of data between the user endpoint device 108 and the AS 104.

In step 210, the user endpoint device 108 sends a request packet, e.g., a first HTTP request packet, to the AS 104, via the primary MPTCP subflow. The first HTTP request packet requests a resource from the AS 104, such as an HTML page, web object, or other content.

In step 212, the user endpoint device 108 receives a response packet, e.g., a first HTTP response packet, from the AS 104, via the primary MPTCP subflow. The first HTTP response packet includes the resource requested in the first HTTP request packet. In one example, the first HTTP response packet also specifies the size of the resource.

In step 214, the user endpoint device 108 determines whether the size of the resource is greater than a threshold, H. In one example, the threshold H is pre-calculated. In another example, the threshold H is calculated dynamically as a function of server round trip time (RTT) and the throughput of the network links between the user endpoint device 108 and the AS 104.

If the user endpoint device 108 concludes in step 214 that the size of the resource is not greater than the threshold H, then the user endpoint device completes the transfer of the resource via the primary MPTCP subflow in step 216, before ending in step 230.

If, however, the user endpoint device 108 concludes in step 214 that the size of the resource is greater than the threshold H, then the primary MPTCP subflow alone is insufficient to transfer the resource. In this case, the method 200 then proceeds to step 220. In step 220, the user endpoint device 108 sends a fourth handshake packet, e.g., a second SYN packet, to the AS 104 over a second access network (e.g., one of access network 120 or access network 122). The second access network may be, for example, a cellular access network (e.g., an LTE access network and the like). In one example, the second SYN packet is a request to establish a secondary MPTCP subflow between the user endpoint device 108 and the AS 104.

In step 222, the user endpoint device 108 receives a fifth handshake packet, e.g., a second SYN-ACK packet, from the AS 104, over the second access network.

In step 224, the user endpoint device 108 sends a sixth handshake packet, e.g., a second ACK packet, to the AS 104, over the second access network. Thus, collectively, steps 220-224 establish an MPTCP subflow between the user endpoint device 108 and the AS 104 via a second three-way handshake. This MPTCP subflow becomes the secondary MPTCP subflow for the exchange of data between the user endpoint device 108 and the AS 104 and cooperates with the primary MPTCP subflow to transfer the data.

In step 226, the user endpoint device 108 sends a second request packet, e.g., a second HTTP request packet, to the AS 104, via the secondary MPTCP subflow. The secondary HTTP request packet requests the resource from the AS 104.

In step 228, the user endpoint device 108 receives a second response packet, e.g., a second HTTP response packet, from the AS 104, via the secondary MPTCP subflow. Once the resource has been provided via the primary MPTCP subflow and the secondary MPTCP subflow working together, the method 200 ends in step 230.

In addition, although not specifically specified, one or more steps, functions or operations of method 200 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 that recite a determining operation or involve a decision do not necessarily require that both branches of the determining operation be practiced. In other words, one of the branches of the determining operation can be deemed as an optional step. Moreover, steps, blocks, functions or operations of the above described method 200 can be combined, separated, and/or performed in a different order from that described above, without departing from the example embodiments of the present disclosure.

Thus, if the size of the resource to be transferred is relatively small (i.e., not greater than a threshold H), the entire resource may be efficiently transferred via a primary MPTCP subflow. If, however, the size of the resource is large (i.e., greater than the threshold H), a secondary MPTCP subflow may be established, and the primary MPTCP subflow and the secondary MPTCP subflow may cooperate to transfer the resource. In this way, the use of MPTCP (and, more particularly, the use of secondary MPTCP subflows and cellular data) can be limited, minimizing unnecessary data and signaling overhead and waste of channel resources.

Referring back to FIG. 3, the threshold H may be a function of server RTT and the throughput of the network links between the user endpoint device 108 and the AS 104. In one example, determining the size of the resource relative to the threshold thus involves determining whether the transfer of the resource can be completed during the time period between the sending of a first HTTP response packet over the secondary MPTCP subflow by the AS 104 and the sending of the second HTTP response packet by the AS 104 (i.e., during the time period $T_6-T_3$ in FIG. 3).

In one example, the RTT of the link over the first access network may be designated as $RTT_1$, while the RTT of the link over the second access network may be designated as $RTT_2$. Assuming that the user endpoint device 108 can send the first HTTP request packet immediately after sending the first ACK packet, the length of the time period $T_3-T_1$ is at least $RTT_1/2$. Moreover, the length of time between the sending of the first ACK packet and the sending of the second SYN packet (i.e., $T_4-T_1$ in FIG. 3) can be defined as T, where T represents how long after the primary MPTCP subflow connection is established the secondary MPTCP subflow connection is established. Thus:

$$T_4-T_3=T-RTT_1/2 \qquad (\text{EQN. 1})$$

where $T_4-T_3$ is the amount of time elapsed between the AS 104 sending the first HTTP response and the user endpoint device 108 sending the second SYN packet (assuming the AS 104 begins transferring the resource immediately after receiving the first ACK packet).

Similarly, the period of time elapsed between the sending of the second HTTP response packet and the sending of the second ACK packet (i.e., $T_6-T_5$ in FIG. 3) can be assumed to be at least $RTT_2/2$. Since the RTT of the link over the second access network, $RTT_2$, is equal to the time elapsed between the sending of the second ACK packet and the sending of the second SYN packet (i.e., $T_5-T_4$ in FIG. 3), $T_6-T_4$ is therefore equal to $3RTT_2/2$. Thus:

$$T_6-T_3=T-RTT_1/2+3RTT_2/2 \qquad (\text{EQN. 2})$$

where $T_6-T_3$ is the amount of time elapsed between the AS 104 sending the second HTTP response and the user endpoint device 108 sending the second SYN packet.

The bandwidth of the link over the first access network may be designated as $B_1$, while the bandwidth of the link over the second access network may be designated as $B_2$. The resource being transferred may not be able to fully utilize the bandwidth of the link over the first access network, so the actual throughput of the link over the first access network may be designated as $\alpha \times B_1$, where $\alpha < 1$ and is obtained or calculated in accordance with techniques that are known in the art. In this case, the secondary MPTCP subflow will be established when the size of the resource exceeds the threshold $$H = \alpha \times B_1 (T - RTT_1/2 + 3RTT_2/2) \quad \text{(EQN. 3)}$$

Thus, in one example, the threshold is equal to the actual throughput of the link over the first access network multiplied by the amount of time elapsed between the AS 104 sending the second HTTP response and the user endpoint device 108 sending the second SYN packet. As an example, if $B_1 = 5$ Mbps, $\alpha = 0.2$, $RTT_1 = 50$ milliseconds, and $RTT_2 = 70$ milliseconds, the value of the threshold H would be 16,000 bytes.

The Linux MPTCP implementation uses the MPTCP_ENABLED socket option to enable the MPTCP protocol for a socket. A web browser may open n TCP connections to a web server, where each TCP connection maps to a socket. According to examples of the present disclosure, the web browser can leverage historical information about the size distribution of resources in order to determine the number of sockets that should be MPTCP-enabled. For instance, if the historical information indicates that approximately fifteen percent of resources have a size that is larger than the threshold H, and the web browser opens six TCP connections to the web server, then the web browser can enable MPTCP for one of those sockets and send eighty-five percent of resources using the other five connections as SPTCP connections.

According to examples of the present disclosure, a web browser can also define a policy whereby a resource will be assigned to an MPTCP connection when at least a threshold percentage (e.g., H') of its content will be transferred via the secondary MPTCP subflow. This amortizes the tail energy consumption of the communication interface for the second access network. The threshold H' may be calculated in a manner similar to that described above for the threshold H.

FIG. 4 depicts a high-level block diagram of a computer 400 suitable for use in performing the functions described herein. In one example, the computer 400 is a multihomed mobile device. As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for web browsing, and various input/output (I/O) devices 406 (e.g., storage devices, including but not limited to, a tape drive, a floppy drive, a hard disk drive or a compact disk drive, a receiver, a transmitter, a speaker, a display, a speech synthesizer, an output port, an input port, a plurality of different network interfaces as discussed above, a user input device (such as a keyboard, a keypad, a mouse, a microphone and the like)). In one example, the I/O devices 406 include at least two separate communication interfaces. Although only one processor element is shown, it should be noted that the computer may employ a plurality of processor elements. Furthermore, although only one computer is shown in the figure, if the method 200 as discussed above is implemented in a distributed or parallel manner for a particular illustrative example, i.e., the steps of the above method 200, or the entire method 200 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method. In one example, instructions and data for the present module or process 405 for web browsing (e.g., a software program comprising computer-executable instructions) can be loaded into memory 404 and executed by hardware processor element 402 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for web browsing for multihomed mobile devices (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not a limitation. Thus, the breadth and scope of a preferred example should not be limited by any of the above-described exemplary examples, but should be defined only in accordance with the following claims and their equivalents.

What is claimed is:

1. A method comprising:
  establishing, via a processor, a primary multipath transmission control protocol subflow for a transfer of a resource to be transferred from a server to a user endpoint device;
  determining, via the processor, a threshold of resource size, wherein the threshold is calculated as a function of a round trip time between the user endpoint device and the server, and wherein the threshold is equal to a throughput of the primary multipath transmission control protocol subflow multiplied by an amount of time that would elapse between the user endpoint device sending a handshake packet to establish a secondary multipath transmission control protocol subflow and the server sending a packet containing a portion of the resource via the secondary multipath transmission control protocol subflow;

receiving, via the processor, a defined size of the resource to be transferred; and establishing, via the processor, the secondary multipath transmission control protocol subflow that cooperates with the primary multipath transmission control protocol subflow for the transfer of the resource to be transferred from the server to the user endpoint device, when the defined size of the resource to be transferred is determined to exceed the threshold.

2. The method of claim 1, wherein the primary multipath transmission control protocol subflow is established over a wireless access network.

3. The method of claim 2, wherein the wireless access network comprises a WiFi network.

4. The method of claim 2, wherein the secondary multipath transmission control protocol subflow is established over a cellular access network.

5. The method of claim 1, wherein the server is a hypertext transfer protocol server.

6. The method of claim 1, wherein the threshold is further calculated as a function of a throughput of the secondary multipath transmission control protocol subflow.

7. The method of claim 1, wherein the primary multipath transmission control protocol subflow comprises a hypertext transfer protocol over multipath transmission control protocol subflow.

8. A non-transitory computer-readable storage device storing a plurality of instructions which, when executed by a processor, cause the processor to perform operations, the operations comprising:

establishing a primary multipath transmission control protocol subflow for a transfer of a resource to be transferred from a server to a user endpoint device;

determining a threshold of resource size, wherein the threshold is calculated as a function of a round trip time between the user endpoint device and the server, and wherein the threshold is equal to a throughput of the primary multipath transmission control protocol subflow multiplied by an amount of time that would elapse between the user endpoint device sending a handshake packet to establish a secondary multipath transmission control protocol subflow and the server sending a packet containing a portion of the resource via the secondary multipath transmission control protocol subflow;

receiving a defined size of the resource to be transferred; and establishing the secondary multipath transmission control protocol subflow that cooperates with the primary multipath transmission control protocol subflow for the transfer of the resource to be transferred from the server to the user endpoint device, when the defined size of the resource to be transferred is determined to exceed the threshold.

9. The non-transitory computer-readable storage device of claim 8, wherein the primary multipath transmission control protocol subflow is established over a wireless access network.

10. The non-transitory computer-readable storage device of claim 9, wherein the wireless access network comprises a WiFi network.

11. The non-transitory computer-readable storage device of claim 9, wherein the secondary multipath transmission control protocol subflow is established over a cellular access network.

12. The non-transitory computer-readable storage device of claim 8, wherein the server is a hypertext transfer protocol server.

13. The non-transitory computer-readable storage device of claim 8, wherein the threshold is further calculated as a function of a throughput of the secondary multipath transmission control protocol subflow.

14. The non-transitory computer-readable storage device of claim 8, wherein the primary multipath transmission control protocol subflow comprises a hypertext transfer protocol over multipath transmission control protocol subflow.

15. An apparatus comprising:

a first network interface supporting a first network access type;

a second network interface supporting a second network access type, wherein the first network access type is different from the second network access type;

a processor; and a computer-readable storage device storing a plurality of instructions which, when executed by the processor, cause the processor to perform operations, the operations comprising:

establishing a primary multipath transmission control protocol subflow for a transfer of a resource to be transferred from a server to a user endpoint device over the first network interface;

determining a threshold of resource size, wherein the threshold is calculated as a function of a round trip time between the user endpoint device and the server, and wherein the threshold is equal to a throughput of the primary multipath transmission control protocol subflow multiplied by an amount of time that would elapse between the user endpoint device sending a handshake packet to establish a secondary multipath transmission control protocol subflow and the server sending a packet containing a portion of the resource via the secondary multipath transmission control protocol subflow;

receiving a defined size of the resource to be transferred; and establishing the secondary multipath transmission control protocol subflow that cooperates with the primary multipath transmission control protocol subflow for the transfer of the resource to be transferred from the server to the user endpoint device over the second network interface, when the defined size of the resource to be transferred is determined to exceed the threshold.

16. The apparatus of claim 15, wherein the first network interface is a wireless network interface.

17. The apparatus of claim 16, wherein the second network interface is a cellular network interface.

18. The apparatus of claim 15, wherein the determining the threshold of resource size further comprises:

calculating the threshold as a function of a throughput of the secondary multipath transmission control protocol subflow.

19. The apparatus of claim 15, wherein the server is a hypertext transfer protocol server.

20. The apparatus of claim 15, wherein the primary multipath transmission control protocol subflow comprises a hypertext transfer protocol over multipath transmission control protocol subflow.

\* \* \* \* \*